United States Patent
Kasuga et al.

(10) Patent No.: US 8,964,209 B2
(45) Date of Patent: Feb. 24, 2015

(54) PRINTER AND PRINTER CONTROL METHOD FOR DAISY CHAIN CONNECTION

(71) Applicant: Seiko Epson Corporation, Tokyo (JP)

(72) Inventors: Takako Kasuga, Nagano-ken (JP); Yuya Iwasa, Nagano-ken (JP); Norio Tsuchiya, Nagano-ken (JP); Toshiaki Koike, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/161,915

(22) Filed: Jan. 23, 2014

(65) Prior Publication Data

US 2014/0211236 A1    Jul. 31, 2014

(30) Foreign Application Priority Data

Jan. 30, 2013    (JP) ................................. 2013-015624

(51) Int. Cl.
  *G06K 15/00*    (2006.01)
  *G06F 3/12*    (2006.01)

(52) U.S. Cl.
  CPC .................................... *G06F 3/1293* (2013.01)
  USPC ........................................................ 358/1.14

(58) Field of Classification Search
  None
  See application file for complete search history.

(56) References Cited

U.S. PATENT DOCUMENTS

| 8,248,645 | B2 * | 8/2012 | Yonezawa ..................... 358/1.15 |
| 2002/0062407 | A1 | 5/2002 | Tateyama et al. |
| 2005/0138226 | A1 | 6/2005 | Tateyama et al. |
| 2008/0123130 | A1 * | 5/2008 | Matsumoto et al. ......... 358/1.15 |
| 2009/0091783 | A1 * | 4/2009 | Kazume et al. .............. 358/1.15 |

FOREIGN PATENT DOCUMENTS

| JP | 10-304007 A | 11/1998 |
| JP | 2003-326808 A | 11/2003 |

* cited by examiner

*Primary Examiner* — Jeremiah Bryar

(57) ABSTRACT

A printer that receives requests to print on plural different media enables efficient system maintenance and system changes. A printer connected in a daisy chain to a host device or a first printer on one side and to a second printer on the other side has a communication unit that receives print request data from the host device or the first printer, and sends the print request data to the second printer; a print unit that interprets the received print request data and executes a printing control process based on the result of data interpretation; and a response unit that generates individual response data for the printer based on the result of the printing control process, generates unified response data from response data received from the second printer and the individual response data, and sends the unified response data to the host device or the first printer.

12 Claims, 3 Drawing Sheets

PRINTER AND PRINTER CONTROL METHOD FOR DAISY CHAIN CONNECTION

Priority is claimed under 35 U.S.C. §119 to Japanese Application No. 2013-015624 filed on Jan. 30, 2013, which is hereby incorporated by reference in its entirety.

BACKGROUND

1. Technical Field

The present disclosure relates to printers that receive requests to print on different media, and relates more particularly to a printer that enables efficient system maintenance and system changes. The disclosure also relates to a printing control method, and to a recording medium storing a printing control program.

2. Related Art

Systems developed for the airline industry and used by airline employees to issue boarding passes, for example, are commonly used in airports. Such systems normally have a host device that generates print request data for boarding passes and other printouts in response to commands issued by the operator, and printers that interpret the print request data and produce the printouts.

These printers produce multiple different types of output, including business class boarding passes, economy class boarding passes, and boarding pass exchange coupons, and different types of paper may be used for each type of printout (type of print media). The content and type of printout may also differ according to the airline.

Such systems are commonly maintained by the airport operator and used by the individual airline companies.

JP-A-2010-52421 discloses technology that uses a daisy chain connection to print multiple types of output.

Even though multiple types of output may be printed on the system used in airports as described above, print requests are preferably output from the host device to a single printer, that is, to one target device. This normally requires a printer with multiple supply trays (bins) and paper paths.

As described above, however, the number of types of printouts produced may differ according to the airline companies that use the system, and plural types of printers may therefore be required to accommodate the different companies. This is inefficient in terms of maintenance and management because multiple different types of spare printers and parts must be kept in stock, for example.

When the airline companies using the system change, such as when a new airline starts service at an airport, changing printers to meet the printing needs of the airline may be necessary, and the resulting cost of equipment is high. This is also not an infrequent need in airports, the resulting problem is therefore important, and a system that can respond efficiently and flexibly to individual airline needs is desirable.

Furthermore, the airport system described above outputs a print request from the host to one printer, and receives one response to the request from the printer. JP-A-2010-52421 does not address responding in this way through a daisy chain connection.

SUMMARY

A printer, a printing control method, and a printing control program according to at least one embodiment of the present invention enable receiving print requests for plural different media and maintaining and changing the system efficiently without needing to change the configuration on the host device side.

One aspect of at least one embodiment of the present invention is a printer that is connected in a daisy chain to a host device or a first printer on one side and to a second printer on the other side, and includes: a communication unit that receives print request data from the host device or the first printer, and sends the print request data to the second printer; a print unit that interprets the print request data received by the communication unit and executes a printing control process based on the result of print request data interpretation; and a response unit that generates individual response data for the printer based on the result of the printing control process of the print unit, generates unified response data from response data received from the second printer and the individual response data, and sends the unified response data to the host device or the first printer.

Preferably, the printer also has a storage unit that stores information about printable paper types; and the print unit decides whether or not to print based on information about the paper type to use contained in the print request data, and the paper type information stored in the storage unit, printing according to the print request data when the print unit decides to print, and not printing when the print unit decides not to print.

Further preferably, the response unit generates the unified response data by selecting data from the individual response data and the received response data, or combining the individual response data and the received response data.

Yet further preferably, the response unit selects the data based on predetermined error level information when data related to an error that occurred is contained in the individual response data or the received response data.

Yet further preferably, the printer is compatible with the first printer and the second printer.

Another aspect of at least one embodiment of the present invention is a printing control method of a printer connected in a daisy chain to a host device or a first printer on one side and to a second printer on the other side, including: receiving print request data from the host device or the first printer, and sending the print request data to the second printer; interpreting the received print request data and controlling a printing process based on the result of print request data interpretation; and generating individual response data for the printer based on the result of the printing process, generating unified response data from response data received from the second printer and the individual response data, and sending the unified response data to the host device or the first printer.

Another aspect of at least one embodiment of the present invention is a computer-readable recording medium recording a printing control program executed by a control unit of a printer connected in a daisy chain to a host device or a first printer on one side and to a second printer on the other side, the program causing the control unit execute steps including: receiving print request data from the host device or the first printer, and sending the print request data to the second printer; interpreting the received print request data and controlling a printing process based on the result of print request data interpretation; and generating individual response data for the printer based on the result of the printing process, generating unified response data from response data received from the second printer and the individual response data, and sending the unified response data to the host device or the first printer.

Other objects and attainments together with a fuller understanding of the invention will become apparent and appreci-

DESCRIPTION OF EMBODIMENTS

Figure 1:
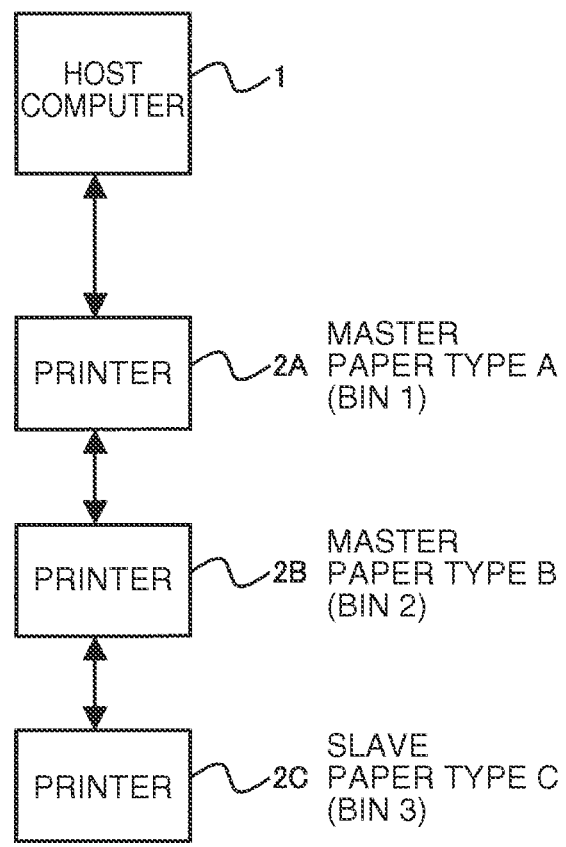
FIG. 1 is a block diagram showing the device connections when using a printer according to some embodiments.

At least one embodiment of the present invention is described below with reference to the accompanying figures. The following embodiment does not limit the technical scope of the invention. Note, further, that identical or like parts are identified and described using the same reference numerals.

FIG. 1 shows the connections between printers in this embodiment of the invention. Printers 2A and 2B in FIG. 1 are printers according to at least one embodiment of the present invention, and are connected in a daisy chain between a host computer 1 on the upstream side and a different type of printer (printer 2C) on the downstream side. When print request data is received from the upstream side side, printers 2A and 2B pass the data directly to the printer on the downstream side, and when response data to the print request data is received from the downstream side, combine and pass the received response data together with their own response data (individual response data) to the upstream side. A system using a printer according to at least one embodiment of the present invention can therefore print efficiently to plural different types of print media without changing the specifications of the legacy host device (host computer 1).

A system according to the embodiment shown in FIG. 1 anticipates being installed in an airport and used by an airline company. This system has a plurality of printers 2 connected in a daisy chain (connected in series as shown in FIG. 1) with a host computer 1 that is the host device of the printers 2, and devices connected to each other can communicate bidirectionally. The number (n) of connected printers 2 is not limited, and the example shown in FIG. 1 has three printers 2 (2A, 2B, 2C) (n=3). Printer 2A is connected to the host computer 1 (host device) on one side of the daisy chain connection, and to printer 2B (as a second printer) on the other side. Printer 2B is similarly connected to printer 2A (as a first printer) on one side of the daisy chain connection, and to printer 2C (as a second printer) on the other side.

Whether a printer 2 functions as a master device or functions as a slave device to other printers 2 is set when the printer is installed. If the host computer 1 is at the upstream side end of the daisy chain, the printer 2 connected at the further downstream end (printer 2C in FIG. 1) is set as the slave device. The other printers 2, that is, each printer 2 having another printer 2 connected thereto on the downstream side (printers 2A and 2B in FIG. 1), are configured as master devices.

This master/slave information is set in each printer 2 before the printing process executes. Each printer 2 stores the master/slave information in nonvolatile memory. The master/slave information is set in each printer 2 by using utility software from the host computer 1 or another medium, or by a setup function of each printer 2, or by a setup command sent from the host computer 1. The type of paper and tray or bin number used for printing is similarly set in each printer 2 during this setup process.

In the example in FIG. 1, printer 2A is a master device, prints on paper type A, and is configured as bin number 1. Printer 2B is also a master device, prints on paper type B, and is configured as bin number 2. Printer 2C is a slave device, prints on paper type C, and is configured as bin number 3.

This system is characterized by the process executed by printers 2 designated as master devices, and the specific content of this process is described below. All of the printers 2 are the same model (same specifications) or have compatible functions and configurations, and have the same number of paper paths. In this embodiment, each of the printers 2A, 2B, and 2C is a single tray (bin) printer with a single paper path.

The host computer 1 is a computer that outputs print requests for tickets, for example, and operates according to the general specifications of a system used in an airport. More specifically, to print, the host computer 1 sends print request data to one printer 2 (2A), and ends a single printing process by receiving response data related to that print request from the printer 2 (2A). An application that generates and sends print request data for the required printout (such as a boarding pass) to the printer 2 based on input information is installed in the host computer 1. This application could be installed for each airline company, and the host computer 1 configured to output the print requests to the printers 2 through middleware.

The application used here requests plural types of output using different types of paper, and in this example more specifically requests output using three types of paper (paper types A, B, C). The host computer 1 therefore recognizes printer 2A as a printer with multiple paper trays (bins), and outputs print requests for each type of paper to printer 2A. The print request data sent from the host computer 1 to the printer 2A contains commands including information about the paper type, and print data for the image to the printed on the particular type of paper. In this example paper type A is for printing first class boarding passes, and paper type B is for printing economy class boarding passes.

Figure 2:
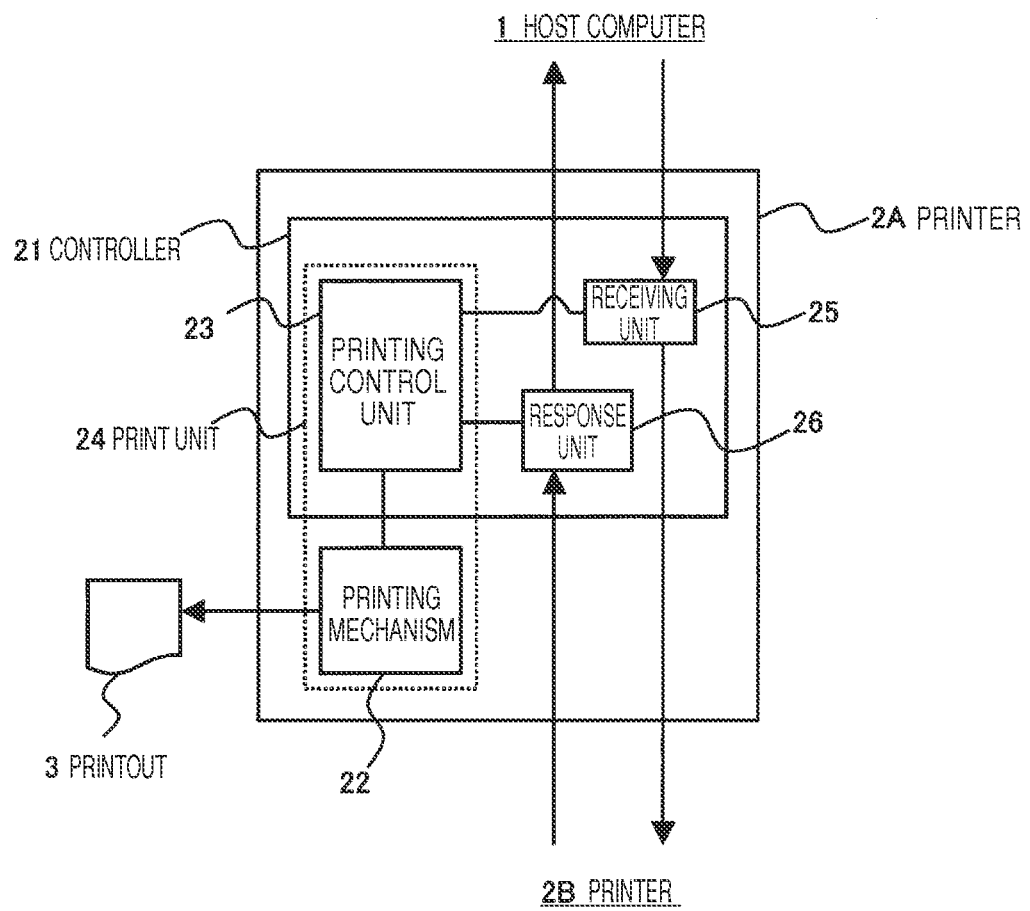
FIG. 2 is a function block diagram of a printer 2A according to some embodiments.

FIG. 2 is a function block diagram of printer 2A. As shown in FIG. 2, the printer 2A has a controller 21 (control unit) and a printing mechanism 22. The controller 21 is the part that controls overall operation of the printer, and includes a CPU, RAM, ROM, flash ROM, and other peripheral circuits. The controller 21 causes the printer 2A to function as a master device at specific times, such as when print request data is received, based on information identifying the printer 2A as a master device and stored in flash ROM, for example.

The printing mechanism 22 is the part that handles conveying the paper (print medium), printing on the paper, and outputting the printout 3 from the printer 2A. A desirable printing method, such as thermal transfer or inkjet printing, can be used. This printer 2A uses paper type A, and when print request data that uses paper type A is received, executes the printing process and outputs the printout 3.

As shown in FIG. 2, the controller 21 includes a printing control unit 23, receiving unit 25 (communication unit), and response unit 26. The printing control unit 23 is the part that controls the printing process, and when the paper type contained in the print request data received by the printer 2A is paper type A, causes the printing mechanism 22 to execute the printing process of the print data contained in the print request data according to the commands contained in the print request data. When the paper type contained in the print request data is not paper type A, the printing control unit 23 does not execute the printing process, that is, skips printing.

The receiving unit 25 is the part that receives print request data sent from the upstream side, which for printer 2A in this example is the host computer 1, passes the received print request data to the printing control unit 23, and sends the received print request data directly to the downstream side, which is printer 2B in this example.

The response unit 26 is the part that returns response data to the print request data received by the receiving unit 25 to the device connected on the upstream side, which for printer 2A is host computer 1. More specifically, the response unit 26 generates printer 2A response data ("individual response data") from the result of the printing process executed by the printing control unit 23 of the printer 2A. The response unit 26 combines this generated individual response data with the response data sent from the downstream side, printer 2B in this example, to generate unified response data, and sends the unified response data to the upstream side, the host computer 1 in this example.

The printing control unit 23, receiving unit 25, and response unit 26 are embodied by a program describing process content, a CPU that executes a process according to the program, ROM storing the program, and RAM, for example. The printing control unit 23 and printing mechanism 22 embody the print unit 24.

Printer 2B is also a master device, and has the same functional configuration as printer 2A.

Printer 2C is also configured identically to the printer 2A, but in this configuration is a slave device and operates as a regular printer that receives print requests from a host. Printer 2C therefore receives print request data sent from the printer 2B as a request from the host, does not pass the data downstream, and returns response data after the printing process as the individual response data to the printer 2B. More specifically, the printer 2C does not execute the above response data combining process.

Figure 3:
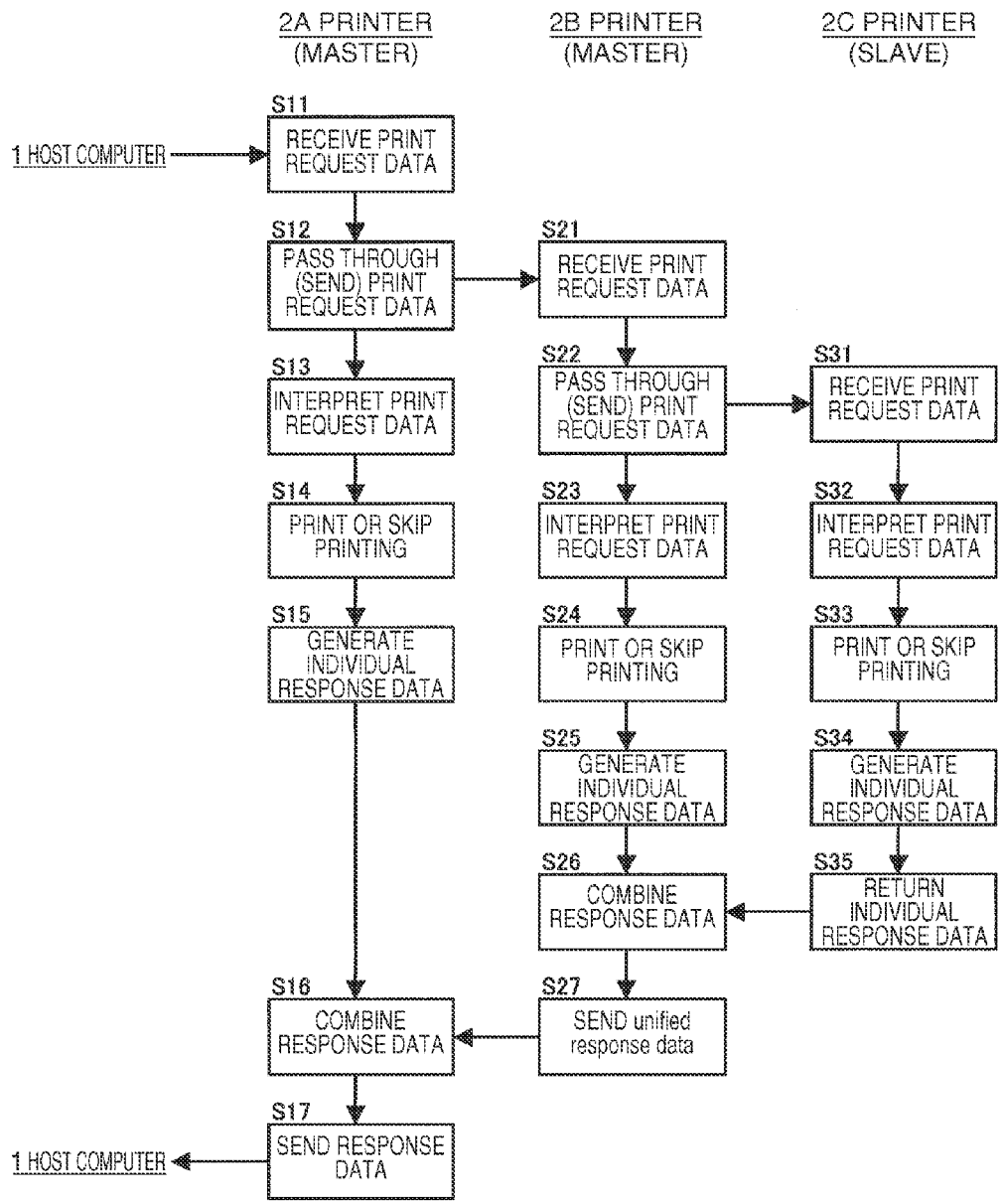
FIG. 3 is a flow chart of processes executed by printers 2A, 2B, 2C.

When a print request is asserted in a system built with at least one embodiment of the present invention configured as described above, the printers 2A, 2B, and 2C execute a process such as described below. FIG. 3 is a flow chart showing steps executed by each of the printers 2A, 2B, and 2C in this process.

First, when print request data is output from the host computer 1, the receiving unit 25 of printer 2A receives the print request data (step S11). After recording the data, the receiving unit 25 then sends the received print request data directly to the printer 2B (step S12).

The receiving unit 25 passes the received print request data to the printing control unit 23, and the printing control unit 23 interprets the print request data (step S13). The printing control unit 23 determines the type of paper used from the information contained in the print request data in this interpretation step, and determines whether or not to execute the printing process. More specifically, the printing control unit 23 determines to execute the printing process if the paper type (paper type A) that can be used by the printer 2A and is stored in flash ROM (storage unit) matches the paper type in the print request data, and determines not to execute the printing process if the paper types are not the same. For example, if the host computer 1 instructs outputting an economy class boarding pass using paper type B, the printing control unit 23 decides that printer 2A does not execute the printing process.

Based on this decision, the printing control unit 23 executes the printing process or skips printing (step S14).

When executing the printing process, the printing control unit 23 instructs the printing mechanism 22 to print based on the result of interpreting the print request data. The printing mechanism 22 then prints the print data contained in the print request data as instructed, and the printout 3 resulting from printing on paper type A is output from the printer 2A. Next, the printing control unit 23 sends information related to the result of the printing process, such as a printing completion report and the number of pieces printed, to the response unit 26. If a paper jam or other error occurred in the printing process, the printing control unit 23 also sends information related to the error, such as error content information or the number of pieces not printed, to the response unit 26.

When the printing control unit 23 decides not to print, the printing control unit 23 sends information reporting that printer 2A does not execute the printing process to the response unit 26. More specifically, this instance is handled as a paper type error, and the printing control unit 23 sends the error report to the response unit 26.

In this example the printing control unit 23 determines whether or not to execute the printing process based on the type of paper, but when a bin number is not contained in the print request data, the printing control unit 23 determines whether or not to execute the printing process according to printing process priority information (the order of printing process priority when a bin number is not contained in the print request data) that is set at the same time the bin number of the printer 2 is set in the setup process described above.

The response unit 26 then generates the individual response data of the printer 2A based on information related to the printing result from the printing control unit 23 or error information in the event the paper type differs (step S15). Because the specifications of the response data returned to the host computer 1 are determined on the host computer 1 side, the individual response data is generated to conform to the specification. Once the individual response data is generated, the response unit 26 waits for response data from the downstream side, that is, from printer 2B.

Printer 2B receives the print request data sent from the printer 2A in step S12 (step S21). Next, the printer 2B forwards the print request data (step S22), interprets the print request data (step S23), determines whether or not to execute the printing process (step S24), and generates individual response data (step S25) in the same way as printer 2A in steps S12 to S15 described above. Steps executed by communication between printer 2A and printer 2B are executed in the same way between printer 2B and printer 2C.

Printer 2C thus receives the print request data sent from the printer 2B in step S22 (step S31). Next, the printer 2B interprets the print request data (step S32), determines whether or not to execute the printing process (step S33), and generates individual response data (step S34) in the same way as the printer 2A in steps S13 to S15.

Because printer 2C is a slave device and a printer is not connected on the downstream side, the step of relaying the print request data (equivalent to steps S12 and S22) is omitted. The printer 2C also does not wait to receive response data from the downstream side after generating the individual response data (step S34).

Therefore, after generating the individual response data, the printer 2C returns the individual response data to the upstream side, that is, to the printer 2B, as the response to the received print request data (step S35).

Printer 2B then combines the response data sent from the downstream printer 2C with the individual response data generated in step S25 (step S26). The part of printer 2B corresponding to the receiving unit 25 of printer 2A performs this combining process. Information is combined and selected appropriately to meet the specifications defined on the host computer 1 side to generate the unified response data sent to the upstream side, that is, printer 2A. For example, if the specifications require returning only information about the bin holding the paper of the type contained in the print request data, the individual response data from the printer 2 that executed the printing process is selected and made the unified response data. If there is a limit to the number of included error reports, the error information contained in the unified response data is selected and combined based on predetermined error level information stored in each printer 2 that functions as a master device.

When the unified response data is generated, the unified response data is sent to the upstream printer 2A (step S27).

The response unit 26 of the printer 2A receives that response data, and performs the same combining process described in step S26 (step S16). This step produces the unified response data that is ultimately returned to the host computer 1.

The response unit 26 then sends the generated unified response data to the host computer 1 (step S17).

The host computer 1 executes the process determined by the received unified response data, and completes processing the current print request.

In this embodiment of the invention the number n of printers is 3 (n=3), but some embodiments of the invention can be applied whenever the number of printers is 2 or more. The printers to printer n-1 from the upstream side function as master devices, and printer n functions as a slave device.

As described above, by connecting multiple printers of the same type each having a single paper tray (bin) in series to a host device in an airport system related to some embodiments of the invention, printing using plural different types of paper is possible without changing the general specifications of the host device. Because only printers of the same type are used in the system, management is simple and maintaining an inventory of consumables and spare devices is more efficient. Adapting to different airline companies using the system is also simple and efficient because the number of same printers can be increased or decreased according to the types of paper needed for the required printouts. Printer configuration is also simple because it is only necessary to store the master/slave designation and paper type information.

Some embodiments of the invention are described with reference to printers used in a system for airports, but can apparently also be used in other system with similar needs.

Various embodiments of the invention being thus described, it will be apparent that such embodiments may be varied in many ways. Such variations are not to be regarded as a departure from the spirit and scope of the instant disclosure, and are intended to be included within the scope of the following claims.

What is claimed is:

1. A printer connected in a daisy chain to a host device or a first printer on one side and to a second printer on the other side, comprising:
   a communication unit that receives print request data from the host device or the first printer, and passes through the print request data directly to the second printer, said print request data specifying a target recording medium selected from a plurality of different recording medium types;
   a storage unit that stores information about a local recording medium, including the availability of said local recording medium to the printer;
   a print unit that interprets the print request data received by the communication unit, decides whether to execute the print request data based on the specified target recording medium and the information about the local recording medium, prints according to the print request data when the print unit decides to execute the print request data, and does not print when the print unit decides not to execute the print request data; and
   a response unit that generates individual response data for the printer based on the decision of the print unit, receives second response data from the second printer, generates unified response data from the second response data and the individual response data, and sends the unified response data to the host device or the first printer.

2. The printer described in claim 1, wherein the print unit decides to execute the print request data and print if the specified target recording medium is available to the printer as determined from the storage information in the storage unit.

3. The printer described in claim 1, wherein:
   if said printer is the only printer in said daisy chain that decided to execute said print request data, then said unified response data includes only said individual response data.

4. The printer described in claim 3, wherein:
   the response unit selects the data with which to generate the unified response data based on predetermined error level information in the individual response data and the second response data.

5. The printer described in claim 1, wherein:
   said printer, first printer, and second printer each has a different local recording medium uniquely available to it, and one of said different local recording media matches said target recording medium.

6. A printing control method of a printer connected in a daisy chain to a host device or a first printer on one side and to a second printer on the other side, comprising:
   receiving print request data from the host device or the first printer, passing through the print request data directly to the second printer, said print request data specifying a target recording medium selected from a plurality of different types of recording media;
   interpreting the received print request data, deciding whether to execute the print request data based on the specified target recording medium and information about a local recording medium including the availability of said local recording medium to the printer, printing according to the print request data when it is decided to execute the print request data, and not printing when it is decided not to execute the print request data; and
   generating individual response data for the printer based on the result of the decision whether to execute the print request data, receiving second response data from the second printer, generating unified response data from the second response data and the individual response data, and sending the unified response data to the host device or the first printer.

7. The printing control method described in claim 6, further comprising:
   deciding to execute the print request data and print if the specified target recording medium is available to the printer as determined from the information about the local recording medium.

8. The printing control method described in claim 7, wherein:
   if said printer is the only printer in said daisy chain that decided to execute said print request data, then said unified response data includes only said individual response data.

9. The printing control method described in claim 6, wherein:
   said first printer is connected to the first printer on said one side, and the print request, data is unmodified print request data sent from the host device.

10. The printing control method described in claim 6, further comprising:

selecting the data with which to generate the unified response data based on predetermined error level information in the individual response data and the second response data.

11. The printing control method described in claim 6, wherein:

said printer, first printer, and second printer each has a different local recording medium uniquely available to it, and one of said different local recording media matches said target recording medium.

12. A non-transitory computer-readable recording medium recording a printing control program executed by a control unit of a printer connected in a daisy chain to a host device or a first printer on one side and to a second printer on the other side, the program causing the control unit execute steps comprising:

receiving print request data from the host device or the first printer, and passing through the print request data directly to the second printer, said print request data specifying a target recording medium selected from a plurality of different types of recording media;

interpreting the received print request data, deciding whether to execute the print request data based on the specified target recording medium and information about a local recording medium including the availability of said local recording medium to the printer, printing according to the print request data when it is decided to execute the print request data, and not printing when it is decided not to execute the print request data; and generating individual response data for the printer based on the result of the decision whether to execute the print request data, receiving second response data from the second printer, generating unified response data from the second response data and the individual response data, and sending the unified response data to the host device or the first printer.

\* \* \* \* \*